United States Patent
Timpe et al.

(10) Patent No.: US 11,960,465 B2
(45) Date of Patent: Apr. 16, 2024

(54) DATABASE INVENTORY ISOLATION

(71) Applicant: salesforce.com, inc., San Francisco, CA (US)

(72) Inventors: Udo Timpe, Jena (DE); Andreas Eiserloh, Jena (DE); Eckart Hilliger, Jena (DE)

(73) Assignee: Salesforce, Inc., San Francisco, CA (US)

( * ) Notice: Subject to any disclaimer, the term of this patent is extended or adjusted under 35 U.S.C. 154(b) by 101 days.

(21) Appl. No.: 17/162,325

(22) Filed: Jan. 29, 2021

(65) Prior Publication Data
US 2022/0245119 A1    Aug. 4, 2022

(51) Int. Cl.
*G06F 16/23*   (2019.01)
*G06Q 10/087*  (2023.01)
*G06Q 30/0202* (2023.01)

(52) U.S. Cl.
CPC ....... *G06F 16/2343* (2019.01); *G06Q 10/087* (2013.01); *G06Q 30/0202* (2013.01)

(58) Field of Classification Search
None
See application file for complete search history.

(56) References Cited

U.S. PATENT DOCUMENTS

| 2008/0071649 A1* | 3/2008 | Dunst, Jr. ............ G06Q 10/087 705/28 |
| 2015/0324779 A1* | 11/2015 | Gala ..................... G06Q 30/06 705/22 |
| 2022/0245119 A1* | 8/2022 | Timpe ................. G06F 16/2343 |

OTHER PUBLICATIONS

Microsoft (Microsoft, Cluster size recommendations for ReFS and NTFS, cited from Wayback machine dated Jan. 16, 2020—https://techcommunity.microsoft.com/t5/storage-at-microsoft/cluster-size-recommendations -for-refs-and-ntfs/ba-p/425960).*

* cited by examiner

*Primary Examiner* — Matthew D Henry
(74) *Attorney, Agent, or Firm* — Butzel Long

(57) ABSTRACT

Systems, devices, and techniques are disclosed for database inventory isolation. Demand levels for access to items may be monitored. The items may have associated inventory counts in a database. An item of the items for which to isolate the inventory count associated with the item may be determined based on the demand levels. The inventory count associated with the determined item may be isolated by moving the inventory count associated with the determined item from a first data block that stores the inventory count associated with the determined item and inventory counts associated with others of the items to a second data block that does not store any other inventory counts.

17 Claims, 10 Drawing Sheets

DATABASE INVENTORY ISOLATION

BACKGROUND

Database systems used to track the inventory of online stores may store inventory counts for multiple items in the same data block. Whenever the inventory count for one of the items needs to be changed, the entire data block storing the inventory count for the item may be locked by the database system while the database transaction to change the inventory count completes. This may prevent any other inventory counts stored in the data block from being changed until the data block is unlocked. A user of an online store may be unable to add an item to their cart or purchase the item while the data block that stores that item's inventory count is locked due to another inventory count stored in that data block being changed.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
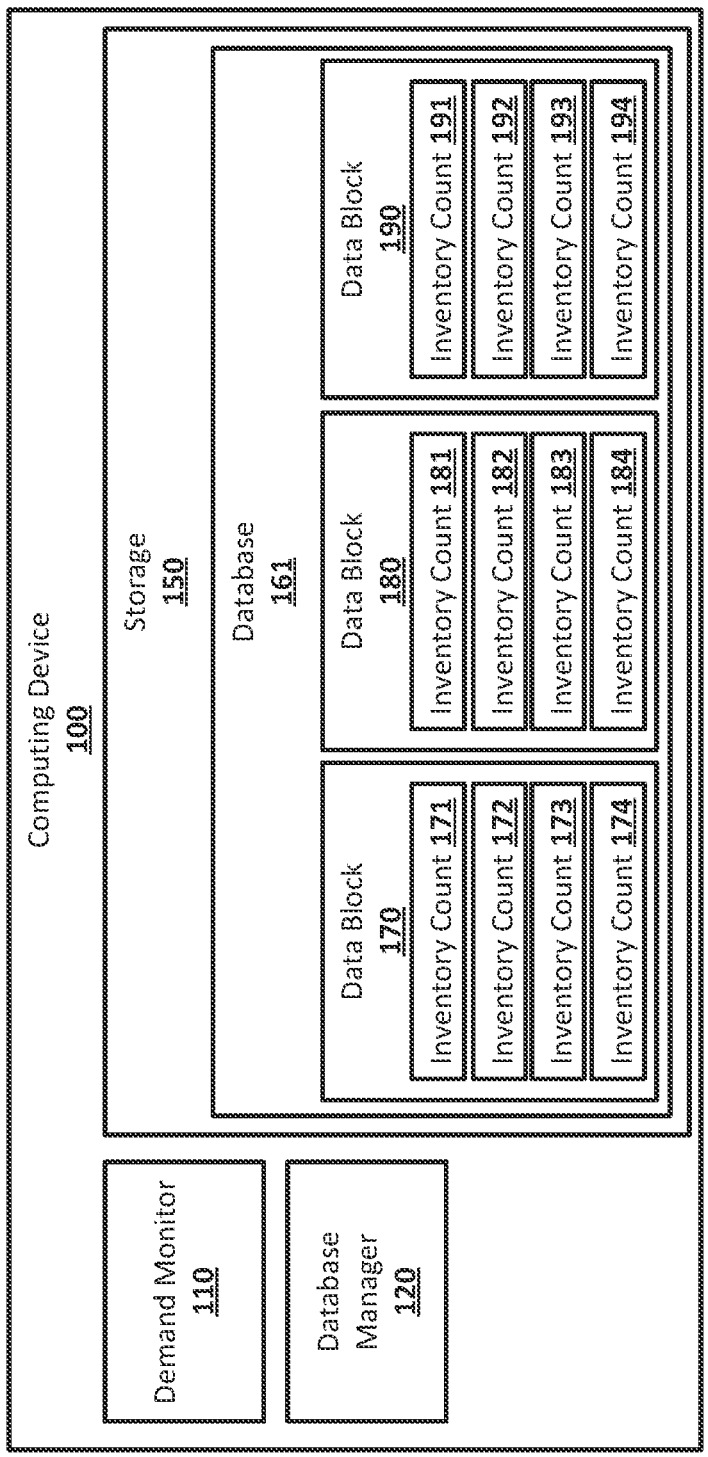
FIG. 1 shows an example system for suitable for database inventory isolation according to an implementation of the disclosed subject matter.

Techniques disclosed herein enable database inventory isolation, which may allow for monitoring of the demand levels for access to items that have inventory counts stored in the data blocks of a database system and for the inventory counts of items with high demand levels to be isolated in separate data blocks in the database system. The demand level for access to items may be monitored. The demand level for access to an item may be monitored by monitoring the database system for timeouts that occur when accessing the data block that stores the inventory count for the item, monitoring the number of times the inventory count for the item is accessed over a time period within a rolling window, or by monitoring the lock events and unlock events for the data block that stores the inventory count for the item. The demand level for access to an item may be used to determine whether the inventory count for the item should be isolated. The demand level for access to an item may be high, indicating that the inventory count for the item should be isolated, when a timeout has occurred when accessing the data block that stores the inventory count, when the number of times the data block that stores the inventory count for the item has been accessed to change the inventory count over a time period within a rolling window exceeds a threshold, or when the data block that stores the inventory count for the item is subject to a number of parallel locks that exceeds a threshold. An inventory count for an item may be isolated by moving the inventory count from the data block that currently stores the inventory count to another data block that stores no other inventory counts.

Inventory counts for items may be stored in a database system. The items may be any goods or services that may be offered in a finite quantity through an online inventory system, such that the good or service can have an inventory of zero. For example, the items may be products being sold by an online store, tickets sold by an online broker, appointments available through an online appointment system, or items otherwise made available through an online inventory system, such as an internal inventory system that tracks components, replacement parts, or other goods within a business or organization and external inventory system that make such goods available outside of the business or organization. For example, an online clothing store may sell various clothes, including various shirts, and the inventory count for the shirts may indicate the number of each type of shirt the online clothing store makes available to customers of the online clothing store. The inventory counts for the items may be stored in a database system. The inventory count for an item may be a count of the quantity of the item that is currently available. The database system may store inventory counts for multiple items in the same data block of the physical storage of the database system. The physical storage of the database system may include, for example, magnetic hard drives, solid state drives, and RAM. The file system of the database system may divide the physical storage into data blocks, which may be the smallest portion of the physical storage that any file stored in the physical storage can take up. The size of the data blocks used by the database system may be much larger than the size of an inventory count. For example, the data blocks may be 8 kilobytes, while the inventory count for a single item, which may be an integer, may be stored in a small number of bytes, for example, 4 bytes or 8 bytes. An inventory count may also be stored along with an identifier for the item that the inventory count is for, taking up additional storage space. A single data block may normally store 20 inventory counts. Storing each inventory count for multiple items in separate data blocks may be inefficient, as each inventory count may use an entire data block, for example, 8 kilobytes worth, of physical storage, while only actually occupying a small portion of that data block.

Inventory counts for multiple items may be stored in the same data blocks. A single data block of a database system may store inventory counts for multiple items from the same online inventory system. For example, the inventory counts for different shirts from the same online clothing store may be stored in the same block. When the inventory count for a single item is changed, the database system may lock the data block that store the inventory count until the change has been completed, for example, decrementing or incrementing the inventory count. The inventory count for an item may be changed based on any suitable event, The inventory count for an item may be changed when a webpage for the item is requested by a user on the user's computing device and when the user closes the webpage, when the item is added to a cart or other pre-transaction construct, when the item is removed from the cart or pre-transaction construct, when the transaction for the item is finalized, or when the transaction for the item is canceled or the item is returned. For example, the inventory count for a shirt may be decremented by one when a webpage for the shirt is requested by a user's computing device accessing an online store, when the user adds the shirt to their cart in the online store, or when the user finalizes their purchase of the shirt, and may be incremented by one when a user who was viewing the webpage for the shirt closes the webpage or after a timeout period elapses with no further action by the user, when the user removes the shirt from their cart in the online store or the shirt is removed automatically after a timeout period elapses with no further action by the user, or when the user cancels a purchase of the shirt or returns the shirt. Whenever the inventory count for the shirt is changed, the data block that stores the inventory count for the shirt may be locked by the database system, preventing any changes to the inventory counts for other shirts sold by the online store and stored in the locked data block until the data block is unlocked. This may prevent users of the online store from performing actions that would result in the inventory counts for the other shirts being changed until the data block storing those inventory counts is unlocked. For example, a user may be unable to add one of the other shirts to their cart until the data block that stores the inventory count for that shirt has been unlocked by the database system.

The demand level for access to items may be monitored, and the demand level for access to an item may be used to determine whether the inventory count for the item should be isolated. The demand level for access to an item may be used to infer how frequently events that will change the inventory count for the item, and lock the data block that stores the inventory count for the item, have occurred or will occur. The demand levels for access to different items with inventory counts stored in a database system may vary over time. For example, online stores may place items on sale, resulting in increased demand levels for access to those items during the time period of the sale. Some sales may have a very short duration, for example, may last only minutes or hours, which may result in large increases in demand level for access to the items being placed on a sale. Monitoring the demand level for access to items may allow for a determination of when the inventory count for an item should be isolated from the other inventory counts in the same data block through moving the inventory count to its own separate data block.

The demand level for access to an item may be monitored by monitoring the database for timeouts that occur when the database system accesses the data block that stores the inventory count for the item. When an event that a change in inventory count is based on occurs, a database transaction to change the inventory count for the appropriate item by the appropriate amount may be generated by the database system. The database system may then attempt to perform the database transaction to change the inventory count. A timeout may occur when the database system attempts to reserve a data block that stores the inventory count for the item in order to perform the database transaction to change the inventory count while the data block is locked due to the database system making changes to an inventory count stored in the data block. The database system may cause the database transaction that changes the inventory count for the item to wait until the data block is unlocked before the database transaction can reserve the data block. If there are other database transactions already waiting to be performed on the data block, the database transaction that changes the inventory count for the item may need to wait until the last of those database transactions has completed. A timeout may be considered to have occurred after any suitable amount of time elapses while a database transaction is waiting after the database system generates and attempts to perform the database transaction. For example, the database system itself may use a length of time of 15 seconds as a timeout period, and may report the occurrence of a timeout, as an error message, if a database transaction has to wait for 15 seconds due to the data block that stores the inventory count the database transaction will change being locked. A shorter timeout period may also be set, for example, between 1 millisecond and 50 milliseconds.

The demand level for access to an item as determined based on monitoring timeouts when the database system access the data block that stores the inventory count for the item may be used to determine whether the inventory count for the item should be isolated. The determination to isolate the inventory count for an item may be made when the number of timeouts in accessing the data block that stores the inventory count detected during the monitoring for timeouts exceeds any suitable threshold number of timeouts. For example, the threshold number of timeouts may be zero, and a determination that the inventory count for the item should be isolated may be made the first time a timeout is detected when the database system attempts to access the data block that stores the inventory count for the item.

For example, a user of an online store may attempt to place a shirt into their cart, which may cause the database system that stores the inventory counts for the online store to generate and perform database transaction to decrement the inventory count for the shirt. The database transaction may attempt to reserve the data block the stores the inventory count for the shirt. If the data block that stores the inventory count for the shirt is already locked, for example, due to a database transaction that is changing the inventory count for the shirt based on the actions of another user or a database transaction that is changing an inventory count stored in the data block for a different item, the database transaction to decrement the inventory count for the shirt may wait. If the database transaction is kept waiting for a length of time that is greater than the timeout period, for example, 5 milliseconds, a timeout may be determined to have occurred. If the threshold number of timeouts is zero, the determination that a timeout has occurred in accessing the data block that stores the inventory count for the shirt may result in the database system determining that the demand level of the shirt is high and the inventory count for the shirt should be isolated.

The demand level for access to an item may be monitored by monitoring accesses to the data blocks that store the inventory counts associated with the items. The number of times the data block storing an inventory count for an item is accessed by the database system in order to perform a database transaction generated to change the inventory count for the item based on events may be counted over a rolling window. For example, if a database system changes the inventory count for an item when a user finalizes their transaction for the item or cancels a finalized transaction, the accesses to the data block that stores the inventory count for the item may result from the performance of database transactions generated based on finalized or canceled transactions for the item, and may be monitored by the database system.

The demand level for access to an item as determined based on monitoring accesses to the data block that stores the inventory count for the item may be used to determine whether the inventory count for the item should be isolated. The determination to isolate the inventory count for an item may be made when the number of accesses to the data block that stores the inventory count for the item by database transactions that change the inventory count for the item exceeds any suitable threshold number of accesses over a specified time period, evaluated on a rolling window-basis. For example, the threshold number of accesses may be 500, the specified time period may be five minutes, and a determination that the inventory count for an item should be isolated may be made when the number of accesses to the data block that stores the inventory count for the item by database transactions that change the inventory count for the item exceeds 500 within a five-minute time period. The threshold may be for accesses to the data block, or may be for accesses to a specific inventory count stored in the data block. If the threshold is for accesses to the data block, the inventory count that should be isolated may be determined based on the inventory count stored in the data block that was targeted for changing by a plurality of the database transactions that accessed the data block during the time period that accesses to the data block exceeded the threshold.

For example, a database transaction that changes the inventory count for a shirt may be generated whenever a user finalizes an order for the shirt in an online store, for example, submitting payment, or cancels a previously finalized order for the shirt. The database system may monitor the number of times the data block that stores inventory count for the shirt is accessed over a rolling window, which may be, for example, five minutes. The data block the stores the inventory count for the shirt may be accessed when the database system performs a database transaction to change the inventory count, for example, decrementing the inventory count when performing a database transaction based on a user finalizing an order for the shirt, and incrementing the inventory count when performing a database transaction based on user cancelling a previously finalized order for the shirt. If the threshold number of accesses is 500 and the specified time period is five minutes, the determination that the data block that stores the inventory count for the shirt has been accessed over 500 times in a five-minute time period by database transactions that change the inventory count for the shirt may result in the database system determining that the demand level for the shirt is high and the inventory count for the shirt should be isolated.

The demand level for access to an item may be monitored by monitoring lock events and unlock events for data blocks that store the inventory counts for the items. Database transactions that change the inventory count for an item may lock the data block that stores the inventory count for the item. When multiple database transactions exist concurrently based on multiple events that result in the need to change the inventory count for an item, the database transactions may be parallel transactions, and may all attempt to obtain a lock on the data block that stores the inventory count for the item. The number of database transactions attempting to obtain a lock on the same data block may be counted as the number of parallel locks for the data block.

The demand level for access to an item as determined based on monitoring lock events and unlock events for the data block that stores the inventory count for the item may be used to determine whether the inventory count for the item should be isolated. The determination to isolate the inventory count for an item may be made when the number of parallel locks on the data block that stores the inventory count for the item created by database transactions that change the inventory count for the item exceeds any suitable threshold number of parallel locks. For example, the threshold number of parallel locks may be 160, and a determination that the inventory count for an item should be isolated may be made when the number of parallel locks on the data block that stores the inventory count is over 160 at any point in time. The threshold may be for parallel locks on the data blocks from any database transaction that attempts to lock the data block, or parallel locks from database transactions that target the inventory count of a specific inventory count stored in the data block. If the threshold is for parallel locks from any database transactions that attempts to lock the data block, the inventory count that should be isolated may be determined based on the inventory count stored in the data block that was targeted for changing by a plurality of the database transactions that requested a lock on the data block at the moment in time the number of parallel locks on the data block exceeded the threshold.

For example, a data block in a database system may store inventory counts for several different shirts that are available for purchase at an online store. The inventory counts for items made available by the store may be changed when a user finalizes an order for an item, such as one of the shirts, or cancels a previously finalized order for the item. The number of locks that database transactions are attempting to acquire in parallel on the data block that stores the inventory count for the shirts, based on database transactions generated from events in the online store including users finalizing orders and canceling finalized orders for shirts with inventory counts stored in the data block, may be monitored. If the threshold number of parallel locks is 160, the determination that the data block that stores the inventory count for the shirts has over 160 parallel locks at any point in time may result in the database system determining that the demand level for the shirt for which most of the database transactions requesting locks on the data block were generated is high and the inventory count for the shirt should be isolated.

Monitoring of the demand level for access to items that have inventory counts stored in a database system and determining whether any inventory counts should be isolated may be performed by any suitable system or component. For example, the monitoring and determining of whether an inventory count should be isolated may be performed by the database system itself, another program running in the same computing environment, for example, same server system, as the database system, or by another computing system that has access to the database system, for example, through a network connection.

When the determination has been made that an inventory count for an item should be isolated, the database system may isolate the inventory count. The database system may isolate an inventory count by performing a database transaction that moves the inventory count from its current data block to a new, empty data block. The new data block may be padded so that the data block appears full to the database system. This may result in the new data block storing only the moved inventory count, and the padding may prevent the database system from storing any other inventory counts in the new data block. Because the new data block stores only a single inventory count, database transactions that change this inventory count may be less likely to have to wait for the new data block to be unlocked in order to complete, as only database transactions that operate on the sole inventory count stored in the new data block will attempt to lock the new data block. This may result in events for the item, such as the adding of the item to a cart of an online store or a user finalizing an order for the item, being prevented, or delayed, less often, increasing the responsiveness of the online transaction system where the item is made available. For example, a shirt in an online store may be the subject of a flash sale that has a very short time period. The database system may determine that the inventory count for the shirt should be isolated, for example, due to the database system detecting a timeout when attempting to access the data block that stores the inventory count for the shirt. Once the inventory count for the shirt is isolated through being moved to a new data block with padding, the database system may experience fewer timeouts attempting to access the new data block to change the inventory count for the shirt, allowing users of the online store to more reliably add the shirt to their carts and/or finalize orders for the shirt during the flash sale.

An inventory count may be isolated at any suitable time. For example, the inventory count may be isolated immediately after it has been determined that the inventory count should be isolated, and any pending database transactions that change the inventory count may be modified as necessary to ensure they change the correct inventory count after the inventory count has been isolated by being moved. The inventory count may also be moved after all database transactions pending at the time it was determined that the inventory count should be isolated have completed, with any database transactions generated during this time period and that change the inventory count being paused until the inventory count has been isolated.

After an inventory count has been isolated, the inventory count may be deisolated. An inventory count for an item may be deisolated, for example, when a specified period of time has passed without the inventory count being changed. The lack of changes to the inventory count for an item over the specified time period may indicate that the demand level for access to the item has decreased, and the inventory count for the item no longer needs to be isolated. The inventory count may be deisolated by, for example, removing the padding from the data block that stores the inventory count. This may allow the database system to store inventory counts for other items in the data block, deisolating the inventory count.

In some implementations, the demand level for items may be monitored by monitoring how frequently items are searched for using a search function of the online transaction system where the item is made available or monitoring how frequently webpages for the item are requested by users of the online transaction system.

FIG. 1 shows an example system for suitable for database inventory isolation according to an implementation of the disclosed subject matter. A computing device 100 may be any suitable computing device, such as, for example, a computer 20 as described in FIG. 11, or component thereof, for implementing database inventory isolation. The computing device 100 may include a demand monitor 110, a database manager 120, and a storage 150. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The demand monitor 110 may be any suitable combination of hardware and software of the computing device 100 for monitoring the demand level for access to items with inventory counts stored on the computing device 100 and determining when an inventory count should be isolated. The demand monitor 110 may monitor the demand level for access to items in any suitable manner, including, for example, monitoring for timeouts in accessing data blocks that store inventory counts, monitoring the number of times data blocks storing inventory counts are accessed over a specified time period, and monitoring the number of parallel locks on individual data blocks. The demand monitor 110 may use the demand level for access to an item to determine when the inventory count for that item should be isolated by being moved to a separate data block that does not store any other inventory counts. The demand monitor 110 may determine that an inventory count for an item should be isolated when, for example, there is a timeout detected when attempting to access the data block the stores that inventory count in order to change the inventory count, when the number of accesses to the data block that stores the inventory count exceeds a threshold number of accesses over a specified time period evaluated on a rolling window-basis, or when the number of parallel locks on the data block that stores the inventory count exceeds a threshold number of parallel locks at any time. The demand monitor 110 may be a component of the database manager 120, or may be separate from and work in conjunction with the database manager 120. For example, the demand monitor 110 may be built-in to the database manager 120 as a feature, may be plug-in that may be added to the database manager 120, or may be a stand-alone program that may be run concurrently with database manager 120.

The database manager 120 may be any suitable combination of hardware and software of the computing device 100 for managing a database. The database manager 120 may be, for example, any suitable database management system. The database manager 120 may generate and implement database transactions to make changes to a database, for example, changing inventory counts in the database. The database manager 120 may generate database transactions in response to, for example, events from other computing devices, such as computing devices that host websites for online transactions systems such as online stores which in turn may receive requests from client computing devices that access the online transaction systems. The database manager 120 may also manage the storage of data within the database, for example, moving data such as inventory counts to different data blocks of the database in order to isolate and deisolate the inventory counts.

The storage 150 may be any suitable combination of hardware and software for storing data. The storage 150 may include any suitable combination of volatile and non-volatile storage hardware, and may include components of the computing device 100 and hardware accessible to the computing device 100, for example, through wired and wireless direct or network connections. The storage 150 may store a database 161. The database 161 may be, for example, a single or a multi-tenant database. The tenants of the database 161 may be, for example, businesses or other organizations that may have online transaction systems, such as online stores, through which items, including goods are services, are made available. The items may be any suitable items that are quantifiable with an inventory count that may need to be changed to track how much of the item is available. Data stored in the database 161 may be divided across data blocks of the storage 150, such as data blocks 170, 180, and 190. The data blocks 170, 180, and 190, may be data blocks of the filesystem used by the storage 150, and may be of any suitable size. For example, the data blocks 170, 180, and 190, may each be 8 kilobytes in size. The inventory counts stored in the database 161 may be distributed across the data blocks 170, 180, and 190. For example, the data block 170 may store the inventory counts 171, 172, 173, and 174, the data block 180 may store the inventory counts 181, 182, 183, and 184, and the data block 190 may store the inventory counts 191, 192, 193, and 194. The inventory counts 171, 172, 173, 174, 181, 182, 183, 184, 191, 192, 193, and 194 may all be, for example, integers of any suitable size that may track inventory for items made available in an online transaction system of a tenant of the database 161. For example, the inventory counts may track the available inventory of clothes sold through an online store. The inventory counts 171, 172, 173, 174, 181, 182, 183, 184, 191, 192, 193, and 194 may be stored along with an identifier for the items whose inventory they track, such as, for example, a stock-keeping unit (SKU) identifier.

Figure 2:
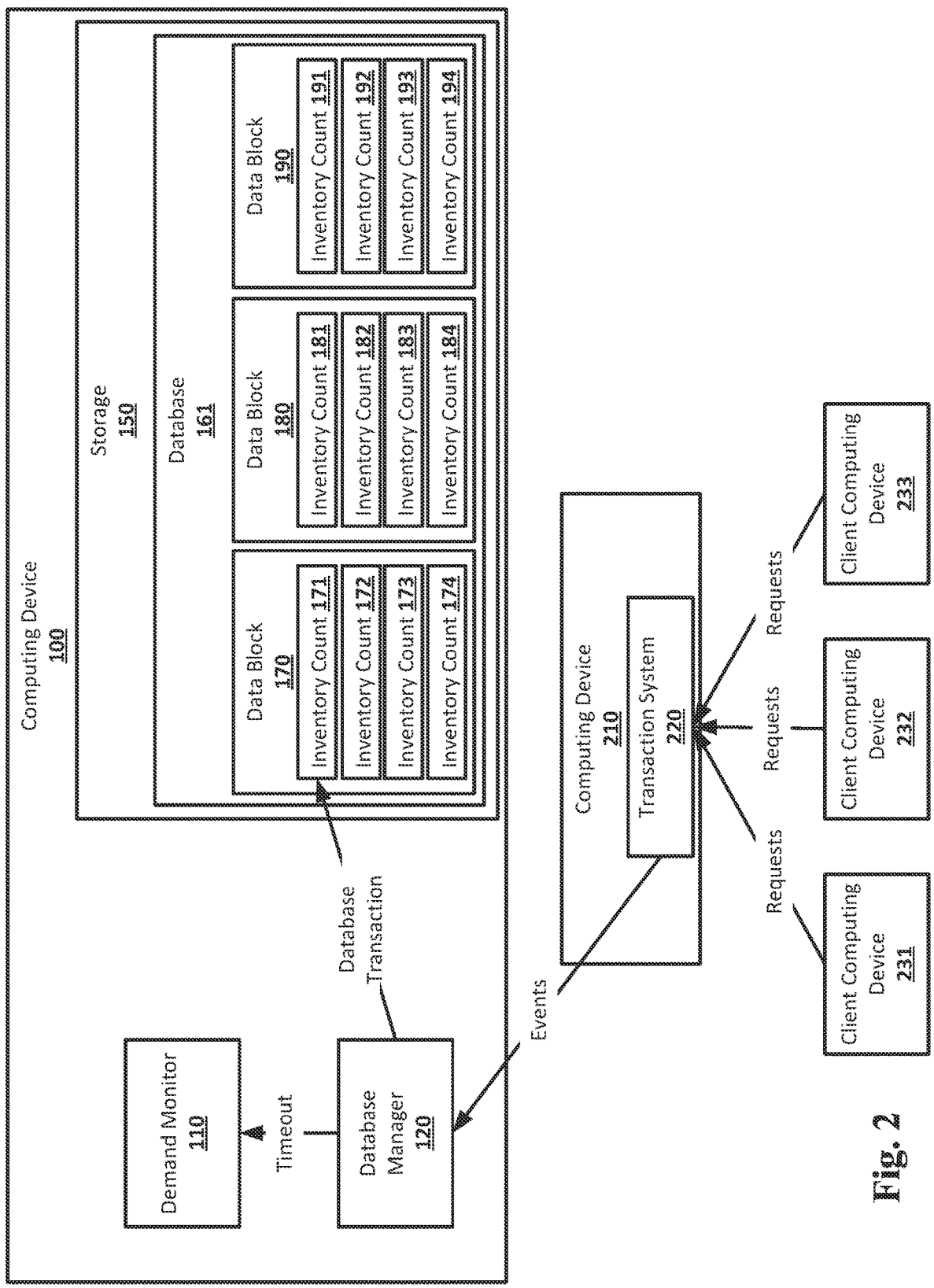
FIG. 2 shows an example arrangement suitable for database inventory isolation according to an implementation of the disclosed subject matter.

FIG. 2 shows an example arrangement for suitable for database inventory isolation according to an implementation of the disclosed subject matter. The demand monitor 110 may determine the demand level for access to items with inventory counts stored in the database 161 by monitoring for timeouts when the database manager 120 attempts to lock data blocks as part of performing database transactions on inventory counts in the database 161. The demand monitor 110 may monitor for timeouts by, for example, listening for timeout events generated by the database manager 120 when a database transaction is determined by the database manager 120 to have timed out, or by, for example, directly monitoring how long database transactions that change an inventory count have to wait before being able to lock the appropriate data block in the database 161. The time period used to determine when a timeout has occurred may be any suitable length of time. For example, the time period may be 15 seconds, as used by the database manager 120 when detecting timeouts before generating a timeout event, or 5 milliseconds, as used by the demand monitor 110 when directly monitoring for timeouts. When the demand monitor 110 detects a timeout, the demand monitor 110 may determine that the inventory count that was the target of the database transaction that timed out may need to be isolated.

For example, a computing device 210 may run a transaction system 220. The computing device 210 may be any suitable computing device, such as, for example, a computer 20 as described in FIG. 11, and may be a component of the computing device 100, which may be a server system, or may be separate from the computing device 100 and connected to the computing device 100 through any suitable network connection. The transaction system 220 may be any suitable online transaction system, such as, for example, an online store including a webpage which may be accessible to client computing devices, such as the client computing devices 231, 232, and 233, through any suitable network connection, and an application server that may handle events created through user inputs to the webpage. For example, the transaction system 220 may be for an online store that sells clothing. The transaction system 220 may make items, such as goods and services, for example, clothes, available. The inventory counts for the items made available through the transaction system 220 may be tracked by the inventory counts, such as the inventory counts 171, 172, 173, and 174, stored in the database 161. The client computing devices 231, 232, and 233, which may be any suitable computing devices, such as the computer 20 described in FIG. 11, may access the transaction system 220 and submit requests. The requests may be, for example, for the adding of items from the transaction system 220 to carts within the transaction system 220. For example, a user using the client computing device 231 may use a webpage hosted by the transaction system 220 to add a shirt to a cart of the transaction system 220. The requests to add items to a cart may be events in the transactions system 220 that may be involve the changing of inventory counts in the database 161, for example, decreasing the inventory count of each item added to a cart by the quantity of the item that is added to the cart.

The transaction system 220 may send events, including, for example, the event type, an identifier of the item that is the target of the event, and the quantity of the item involved in the event, to the database manager 120. For example, an event indicating that a single shirt is being added to a cart may be sent by the transaction system 220 to the database manager 120. The database manager 120 may generate a database transaction based on an event received from the transaction system 220 that changes the inventory count of the item that is the target of the event by the specified quantity, increasing or decreasing the inventory count based on the event type. For example, the database manager 120 may generate a database transaction that decreases the inventory count for the shirt the user is adding to their cart by a quantity of one. The database manager 120 may attempt to perform the generated database transaction, changing the appropriate inventory count in the database 161. For example, the database transaction may target the inventory count 171, which may track the inventory of the item, for example, shirt, that was the target of the event in the transaction system 220 that database transaction was generated based on.

The database transaction, upon execution by the database manager 120, may attempt obtain a lock on the data block 170 that stores the inventory count 171, for example, the inventory count for the shirt, that is the target of the database transaction. The database transaction may be forced to wait to obtain the lock if any previously executed database transactions already have a lock on the data block 170 or were already waiting to obtain a lock on the data block 170, even if they are making changes to an inventory count in the data block 170 other than the inventory count 171, such as the inventory count 172. This may occur, for example, when other users, such as users of the client computing device 232 and 233, have added items to their carts in the transaction system 220 that have inventory counts in the data block 170.

For example, a user of the client computing device 232 may have added a pair of paints to their cart, and the pants may be tracked by the inventory count 172, and a user of the client computing device 233 may have added the shirt tracked by the inventory count 171 to their cart before the user of the client computing device 231 did so. If the database transaction, after being executed, is forced to wait to obtain a lock on the data block 170 for a time period that exceeds a timeout period, a timeout may be detected. For example, if the demand monitor 110 monitors for timeouts by waiting for timeout events to be reported by the database manager 120, the timeout period may be, for example, 15 seconds. If the demand monitor 110 is actively monitoring for timeouts, for example, by measuring the amount of time between a database transaction being executed and a lock on the data block with the target inventory count being obtained, the timeout period may be, for example, 15 milliseconds or less. Once the demand monitor 110 has detected a timeout of the database transaction in attempting to obtain a lock on the data block 170, the demand monitor 110 may determine that the inventory count 171, as the target of the database transaction that timed out, should be isolated. The timeout may indicate that the demand level for access to the item tracked by the inventory count 171 is high.

The demand monitor 110 may monitor timeouts for all of the inventory counts in all of the data blocks of the database 161. The demand monitor 110 may determine that any of the inventory counts 171, 172, 173, 174, 181, 182, 183, 184, 191, 192, 193, and 194 may need to be isolated based on the detection of timeouts, and may isolate inventory counts from data blocks that have already had another inventory count isolated. For example, after the inventory count 171 is isolated based on a detected timeout of a database transaction that targets the inventory count 171, the inventory 173 may also be isolated if a database transaction targeting the inventory count 173 times out.

Figure 3:
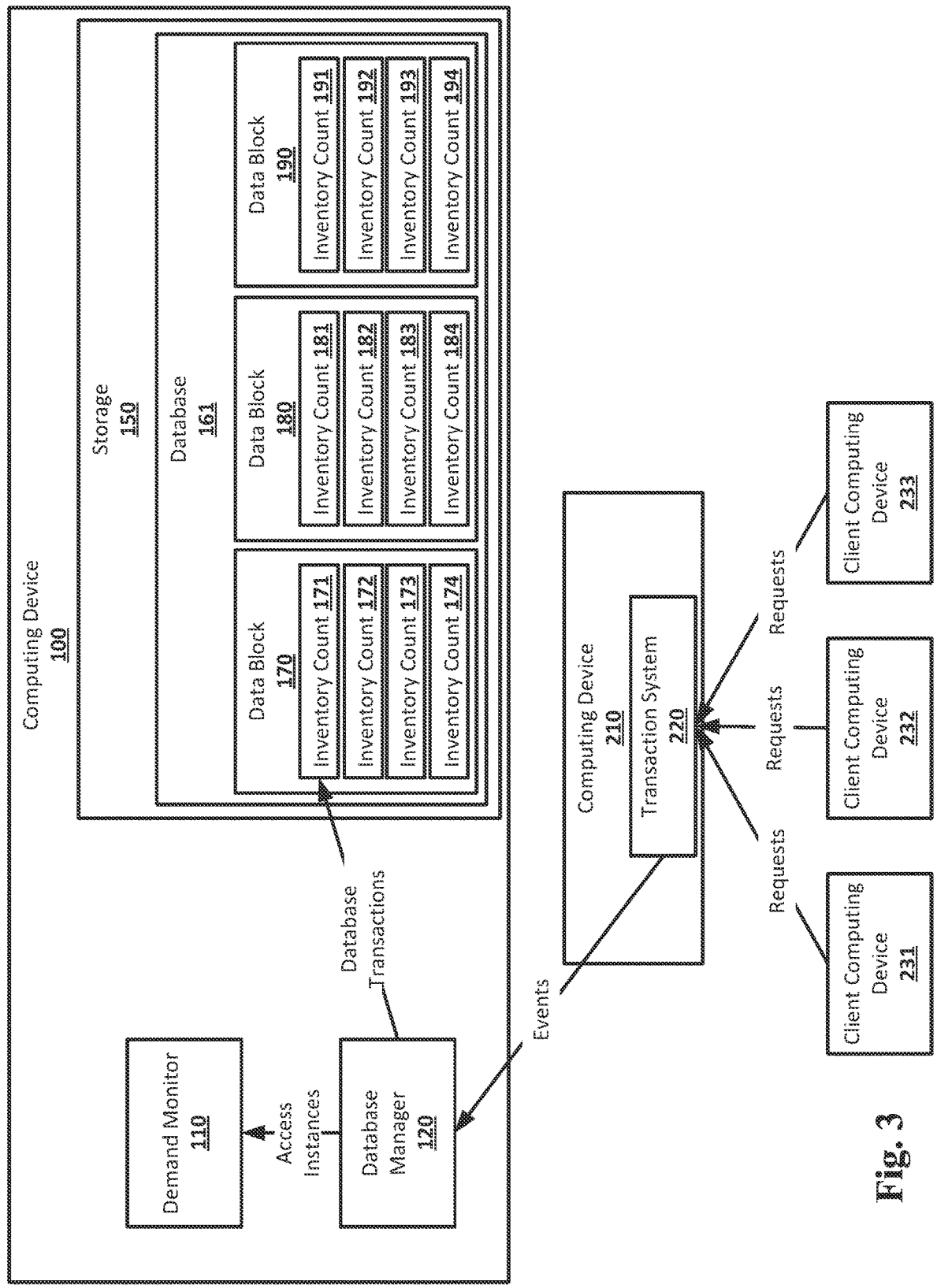
FIG. 3 shows an example arrangement suitable for database inventory isolation according to an implementation of the disclosed subject matter.

FIG. 3 shows an example arrangement for suitable for database inventory isolation according to an implementation of the disclosed subject matter. The demand monitor 110 may determine the demand level for access to items with inventory counts stored in the database 161 by monitoring accesses to the data blocks of the database 161, for example, the data blocks 170, 180, and 190. The demand monitor 110 may monitor accesses to data blocks by, for example, keeping a running count of the number of database transactions that have accessed inventory counts and adding to the counts for the data blocks that store those inventory counts. For example, a database transaction with the inventory count 171 as a target may be counted by the demand monitor 110 as an access to the data block 170. The running count may be kept over a rolling window that may be any suitable time period, such as, for example, five minutes, with accesses being added to the count as they occur and being removed from the count whenever they are older than the time period. The demand monitor 110 may receive each instance of access to a data block of the database 161 from the database manager 120 for example, by requesting data from an order journal of the database 161 that may the database manager 120 may use to track database transactions. The threshold number of accesses to a data block over the time period within the rolling window used to determine when the demand level for access to an item is high may be any suitable number. For example, the threshold number of accesses to a data block may be 500 over a five-minute rolling window. When the demand monitor 110 determines that the access count for a data block has exceeded 500 over the previous 5 minutes at any point in time, the data monitor 110 may determine that an inventory count in the data block may need to be isolated. In some implementations, instead of keeping separate access counts for each data block of the database 161, the data monitor 110 may keep separate access counts for each combination of data block and inventory count of the database 161.

For example, the transaction system 220 may send events to the database manager 120 as the events are generated by the actions of users of client computing devices, such as the client computing devices 231, 232, and 233, as they add and remove items from their carts in the transaction system 220. The events received by the database manager 120 may cause the database manager 120 to generate database transactions that target the appropriate inventory counts for the items that are the targets of the events sent by the transaction system 220. For example, several of the events may be the adding of a shirt whose inventory is tracked by the inventory count 171 to carts in the transaction system 220. The shirt may, for example, be subject to a flash sale, which may reduce the price of the shirt for a limited period of time, resulting in an increased frequency of users adding the shirt to their cart. The demand monitor 110 may count the instances of access to the data block 170 from the database transactions generated by the database manager 120 in response to the events from the transaction system 220. If, at any point, the number of accesses to the data block 170 over the preceding five minutes exceeds the threshold of 500, the demand monitor 110 may determine that an inventory count stored in the data block 170 may need to be isolated. The demand monitor 110 may, for example, determine that the inventory count of the data block 170 which was the target of the most database transactions over the preceding five minutes, for example, the inventory count 171, may need to be isolated, as the demand for the item whose inventory the inventory count 171 tracks may be high.

Figure 4:
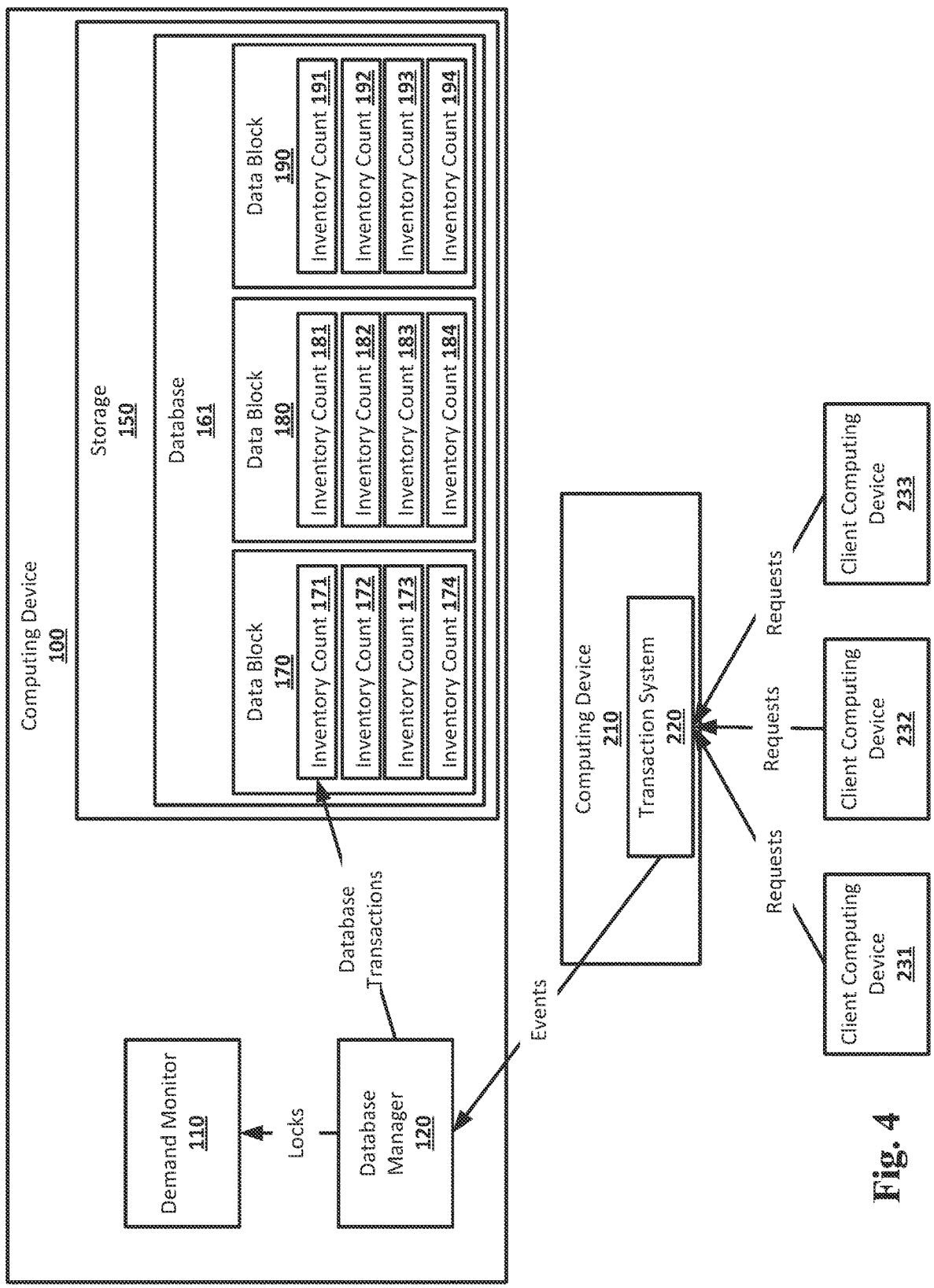
FIG. 4 shows an example arrangement suitable for database inventory isolation according to an implementation of the disclosed subject matter.

FIG. 4 shows an example arrangement for suitable for database inventory isolation according to an implementation of the disclosed subject matter. The demand monitor 110 may determine the demand level for access to items with inventory counts stored in the database 161 by monitoring parallel locks on data blocks of the database 161, for example, the data blocks 170, 180, and 190. The demand monitor 110 may monitor parallel lock on data blocks by, for example, keeping a count of the number requests for locks on data blocks from database transactions that have been generated to access specific inventory counts. For example, a database transaction with the inventory count 171 as a target may request a lock on the data block 170, and the demand monitor 110 may count the request for a lock as a parallel lock on the data block 170. If, for example, 150 database transactions have pending requests for locks on the data block 170, the number of parallel locks counted for the data block 170 may be 150. As database transactions obtain and then release locks on a data block, the number of parallel locks for the data block may be decreased. For example, if one of the 150 database transactions obtains a lock on the data block 170, changes the inventory count 171, and then unlocks the data block 170, the number of parallel locks on the data block 170 may decrease to 149 if no new database transactions request a lock in the interim. The threshold number of parallel locks on a data block used to determine when the demand level for access to an item is high may be any suitable number. For example, the threshold number of parallel locks on a data block may be 160 parallel locks. When the demand monitor 110 determines that there are more than 160 parallel locks on a data block at any point in time, the data monitor 110 may determine that an inventory count in the data block may need to be isolated. In some implementations, instead of keeping separate counts of parallel locks for each data block of the database 161, the data monitor 110 may keep separate counts of parallel locks for each combination of data block and inventory count of the database 161.

For example, the transaction system 220 may send events to the database manager 120 as the events are generated by the actions of users of client computing devices, such as the client computing devices 231, 232, and 233, as they add and remove items from their carts in the transaction system 220. The events received by the database manager 120 may cause the database manager 120 to generate database transactions that target the appropriate inventory counts for the items that are the targets of the events sent by the transaction system 220. For example, several of the events may be the adding of a shirt whose inventory is tracked by the inventory count 171 to carts in the transaction system 220. The shirt may, for example, be subject to a flash sale, which may reduce the price of the shirt for a limited period of time, resulting in an increased frequency of users adding the shirt to their cart. The demand monitor 110 may count the number of parallel locks on the data blocks 170, 180, and 190, based on lock requests from database transactions generated by the database manager 120 in response to the events from the transaction system 220. If, at any point, the number of parallel locks on the data block 170 exceeds the threshold of 160, the demand monitor 110 may determine that an inventory count stored in the data block 170 may need to be isolated. The demand monitor 110 may, for example, determine that the inventory count of the data block 170 which was the target of the most database transactions over the preceding five minutes, for example, the inventory count 171, may need to be isolated, as the demand for the item whose inventory the inventory count 171 tracks may be high.

The demand monitor 110 may monitor parallel locks in any suitable manner. For example, the demand monitor 110 may use parallel monitoring to monitor the number of parallel locks on data blocks in the database 161. Every application server that interacts with the database manager 120 may register an event handler to two channels, one for listening to lock events and one to listen unlock events. For example, the transaction system 220 may include an application server that may register an event handler to listen for lock events generated by the database manager 120 when locking and unlocking data blocks based on events from the transaction system 220. The event handlers may include counters that may track the parallel locks on each data block of the database 161. The counters of the event handlers may be used by the demand monitor 110 to determine when a data block of the database 161 has a number of parallel locks that exceed the threshold number of parallel locks.

The demand monitor 110 may also use partitioned monitoring to the number of parallel locks on data blocks in the database 161. The event handlers registered on the application servers may each be configured to listen for lock and unlock events on specific data blocks, rather than listening for events on all data blocks of the storage 150.

Figure 5:
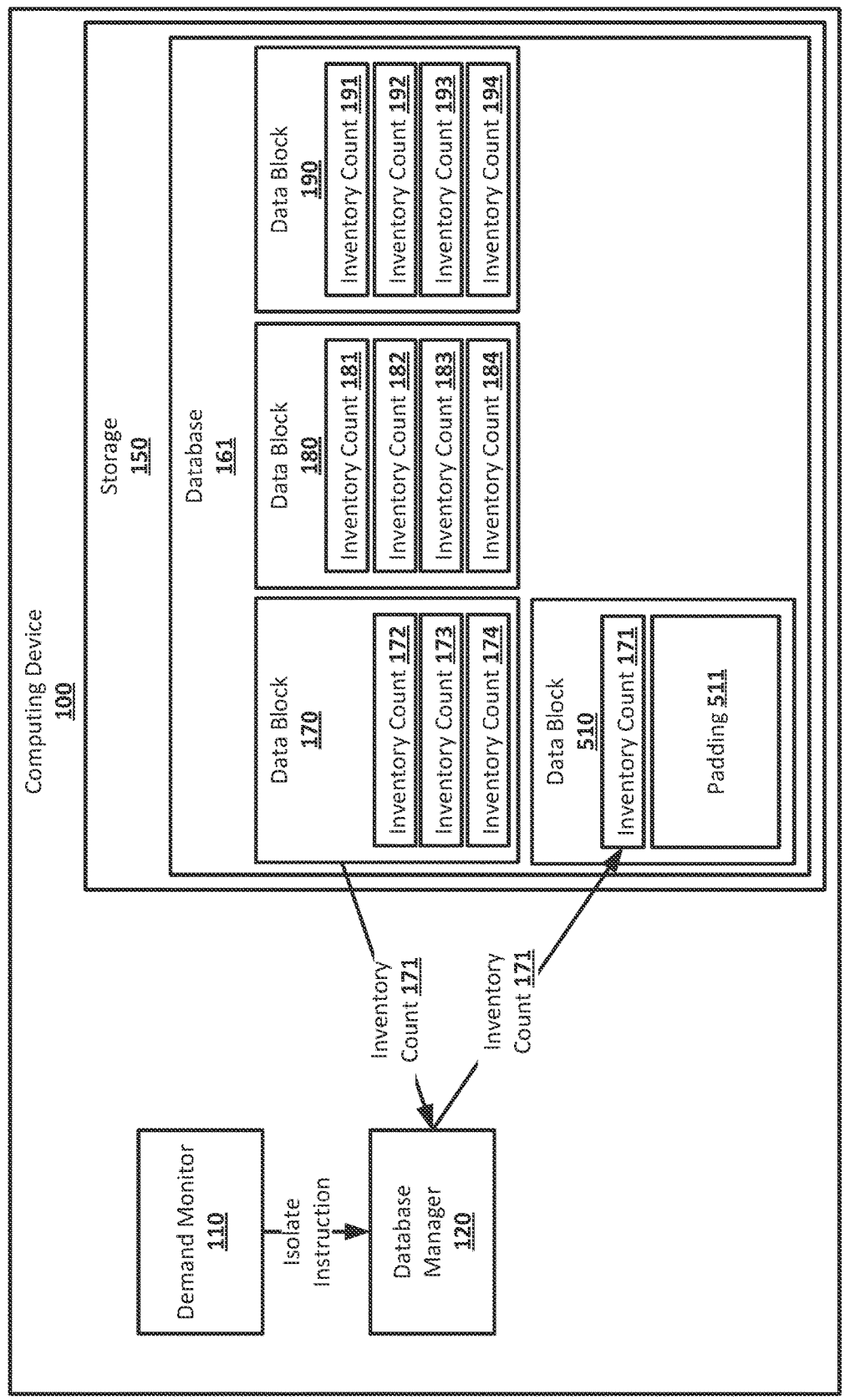
FIG. 5 shows an example arrangement suitable for database inventory isolation according to an implementation of the disclosed subject matter.

FIG. 5 shows an example arrangement for suitable for database inventory isolation according to an implementation of the disclosed subject matter. When the demand monitor 110 determines that the demand level for access to an item is high, the inventory count for that item may be isolated. For example, the demand monitor 110 may determine that the demand level for access to the item tracked by the inventory count 171 is high. The demand monitor 110 may cause the database manager 120 to isolate the inventory count 171. The database manager 120 may isolate the inventory count 171 by moving the inventory count 171 from the data block 170 to the data block 510. The data block 510 may be an empty data block of the storage 150, and may be part of the database 161, for example, having been already allocated to the database 161 or being allocated to the database 161 at the time the inventory count 171 is moved. The database manager 120 may add padding 511 to the data block 510. The padding 511 may prevent the database manager 120 from storing additional inventory counts in the data block 510, ensuring that the inventory count 171 remains isolated in the data block 510 until the padding 511 is removed. Isolating the inventory count 171 may allow for faster access to the inventory count 171, as database transactions that target the inventory count 171 may no longer have to wait for preceding database transactions that target the other inventory counts stored in the block 170 to complete before being able to lock and change the inventory count 171. This may make the transactions system 220 more responsive to users of client computing devices, such as the client computing devices 231, 232, and 233, when adding the item whose inventory the inventory count 171 tracks to their carts. Users who attempt to add the item whose inventory is tracked by the inventory count 171 to their carts may be less likely to see a wait time while waiting for the database transaction that changes the inventory count 171 to complete before the item is actually added to their carts.

Figure 6:
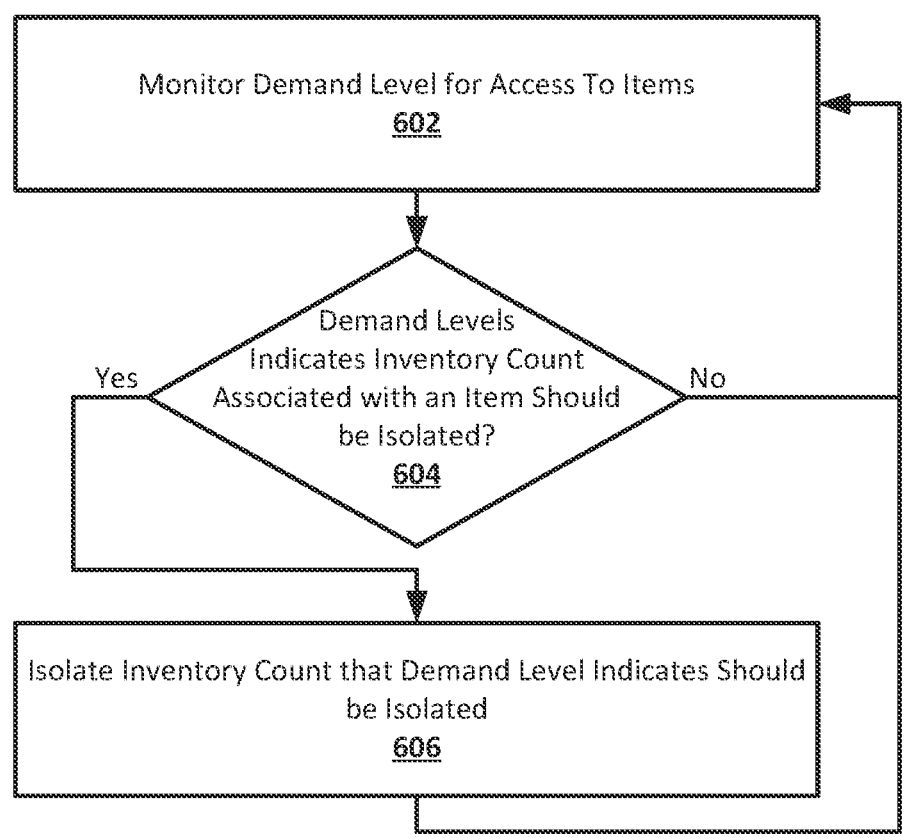
FIG. 6 shows an example procedure suitable for database inventory isolation according to an implementation of the disclosed subject matter.

FIG. 6 shows an example procedure suitable for database inventory isolation according to an implementation of the disclosed subject matter. At 602, the demand levels for access to items may be monitored. The items may be, for example, items with associated inventory counts in the database 161. The demand monitor 110 may monitor the demand level for access to the items in any suitable manner. For example, the demand monitor 110 may monitor timeouts that occur among database transactions that are generated to change the inventory counts for the items, monitor the number of accesses to data blocks, such as the data blocks 170, 180, and 190, that store the inventory counts for the items, or may monitor the number of parallel locks on the data blocks that store the inventory counts for the items.

At 604, if the demand levels for access to the items indicates that the inventory count for an item should be isolated, flow may proceed to 606, otherwise flow may proceed back to 602. For example, the demand monitor 110 may determine based on the demand levels for access to items, such as the items with inventories tracked by the inventory counts 171, 172, 173, 174, 181, 182, 183, 184, 191, 192, 193, and 194, that the demand level for access to an item is high, indicating that the inventory count for the item should be isolated. The demand monitor 110 may determine that the demand level for access to an item is high based on, for example, a database transaction that changes the inventory count for the item timing out, the number of accesses to the data block that stores the inventory count for the item exceeding a threshold number over the specified time period within a rolling window, or the number of parallel locks on the data block that stores the inventory count for the item exceeding a threshold number at any point in time.

At 606, the inventory count that the demand levels for items indicate should be isolated may be isolated. The demand monitor 110 may determine that the demand level for access to an item whose inventory is tracked by an inventory count in the database 161 indicates that the inventory count for the item should be isolated. For example, the demand level for access to the item associated with the inventory count 171 may indicate that the inventory count 171 should be isolated. The inventory count 171 may be moved from its current data block, the data block 170, to an empty data block, for example, the data block 510, that does not store any other inventory counts. The inventory count 171 may be moved by, for example, the database manager 120. The data block 510 may have the padding 511, which may ensure that no additional inventory counts are stored in the data block 510.

Figure 7:
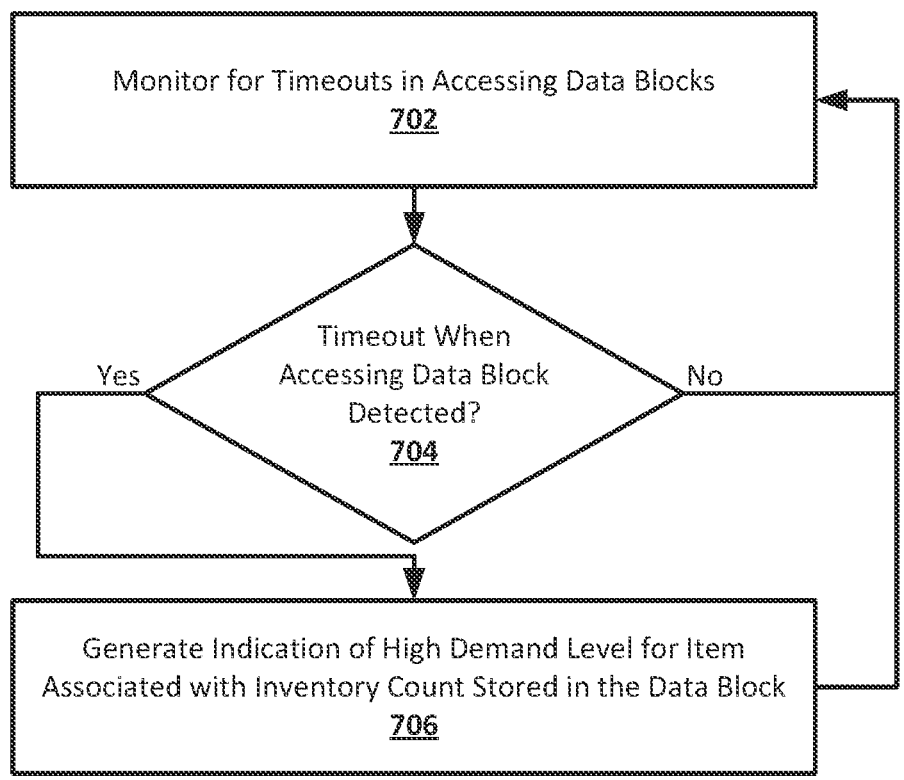
FIG. 7 shows an example procedure suitable for database inventory isolation according to an implementation of the disclosed subject matter.

FIG. 7 shows an example procedure suitable for database inventory isolation according to an implementation of the disclosed subject matter. At 702, timeouts in accessing data blocks may be monitored for. For example, the demand monitor 110 may monitor for database transactions that timeout when attempting to access data blocks, such as the data blocks 170, 180, and 190, of the database 161, in order to change inventory counts. The demand monitor 110 may monitor for timeouts by listening for timeout events from the database manager 120, or by timing how long database transactions are forced to wait when the database transactions try to access data blocks of the database 161.

At 704, if a timeout is detected in the accessing of a data block, flow may proceed to 706, otherwise flow may proceed back to 702. For example, the demand monitor 110 may detect that a timeout has occurred when a database transaction attempts to access a data block, for example, the data block 170, of the database 161.

At 706, an indication for a high demand level may be generated for an item associated with an inventory count stored in the data block that the database transaction timed out attempting to access. For example, the demand monitor 110, after detecting that a database transaction has timed out attempting to access the data block 170, may generate an indication that the demand level for access to an item whose inventory count is stored in the data block 170 is high. The item may be, for example, the item whose inventory count was the target of the database transaction that timed out. For example, if the database transaction that timed out was generated to change the inventory count 171, the demand monitor 110 may generate an indication that the demand level for access to the item associated with the inventory count 171 is high. The indication may be, for example, an instruction or command that may indicate that the inventory count 171 should be isolated, and may be sent to the database manager 120.

Figure 8:
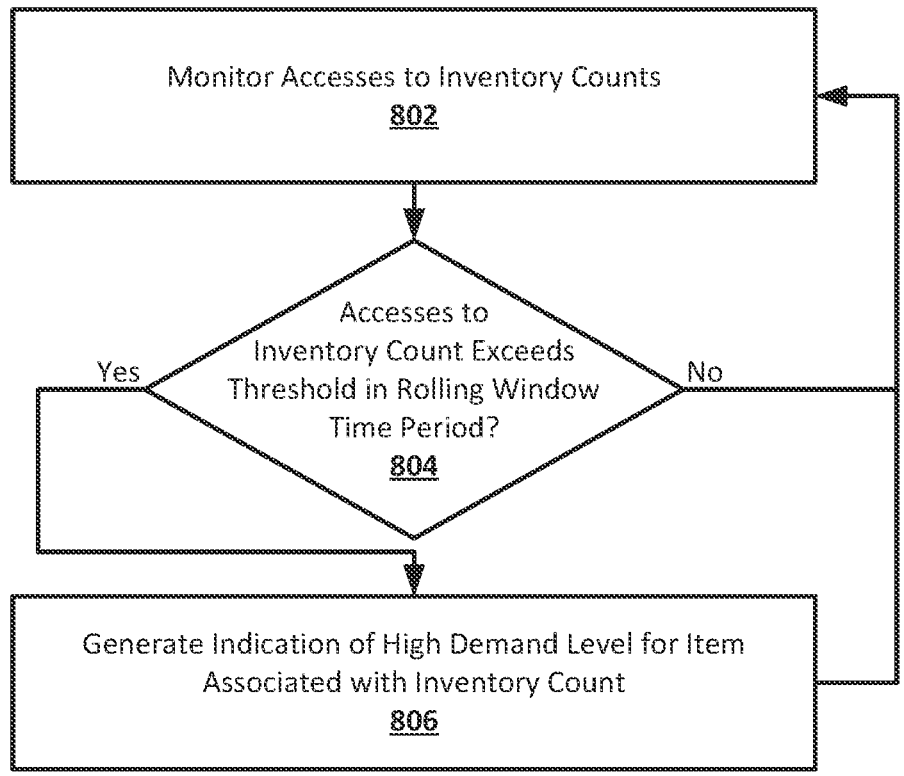
FIG. 8 shows an example arrangement suitable for database inventory isolation according to an implementation of the disclosed subject matter.

FIG. 8 shows an example procedure suitable for database inventory isolation according to an implementation of the disclosed subject matter. At 802, accesses to inventory counts may be monitored. For example, the demand monitor 110 may monitor for accesses to inventory counts stored in data blocks, such as the data blocks 170, 180, and 190, of the database 161 by database transactions. The demand monitor 110 may count the accesses to each inventory count and/or data block. The count may be kept over a specific time period for a rolling window, with accesses older than the time period of the rolling window falling out of the count.

At 804, if the number of accesses to an inventory count or data block exceeds a threshold within the time period of the rolling window, flow may proceed to 806, otherwise flow may proceed back to 802. For example, the demand monitor 110 may determine that the number of accesses to the data block 170 has exceeded the threshold for accesses within the time period of the rolling window based on the number of database transactions that accessed the data block 170 to change an inventory count over the time period of the rolling window.

At 806, an indication of a high demand level may be generated for an item associated with an inventory count stored in the data block that had accesses exceed the threshold within the time period of the rolling window. For example, the demand monitor 110, after determining that the number of accesses to the inventory count 171, or the data block 170, over the rolling window exceeds the threshold for accesses, may generate an indication that the demand level for access to an item whose inventory count is stored in the data block 170 is high. The item may be, for example, the item whose inventory count was the target of the plurality of the database transactions that accessed the data block 170 within the time period of the rolling window. For example, if the plurality of database transactions that accessed the data block 170 within the time period of the rolling window were generated to change the inventory count 171, the demand monitor 110 may generate an indication that the demand level for access to the item associated with the inventory count 171 is high. The indication may be, for example, an instruction or command that may indicate that the inventory count 171 should be isolated, and may be sent to the database manager 120.

Figure 9:
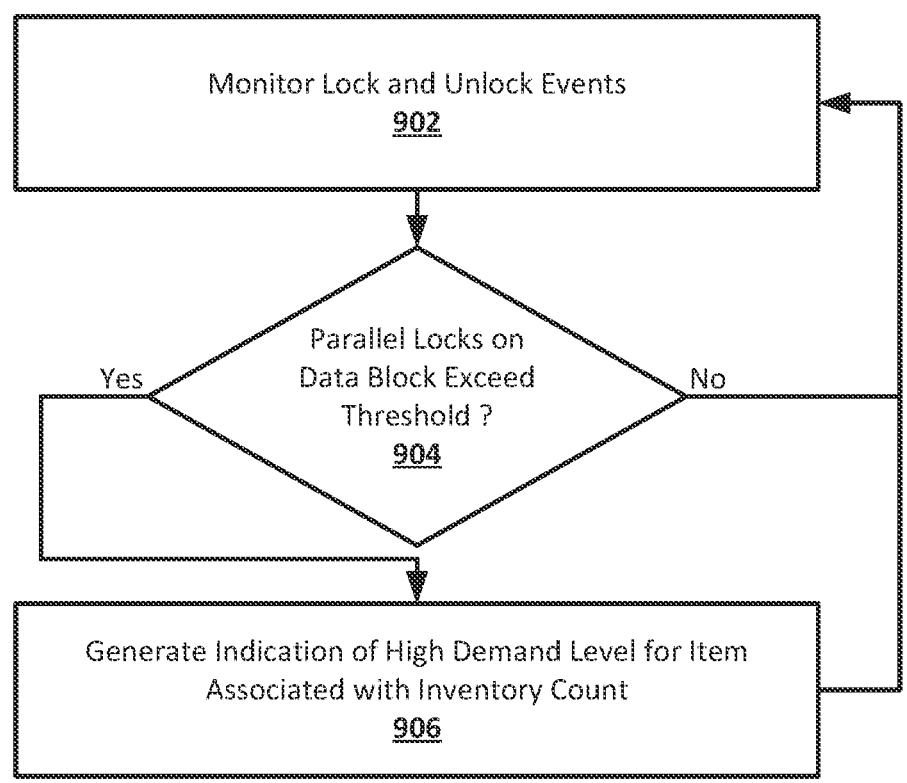
FIG. 9 shows an example procedure suitable for database inventory isolation according to an implementation of the disclosed subject matter.

FIG. 9 shows an example procedure suitable for database inventory isolation according to an implementation of the disclosed subject matter. At 902, lock and unlock events may be monitored. For example, the demand monitor 110 may monitor for lock and unlock events for data blocks, such as the data blocks 170, 180, and 190, of the database 161, caused by database transactions. The demand monitor 110 may keep counts of the number of parallel locks on each of the data blocks of the database 161.

At 904, if the number of parallel locks on a data block exceeds a threshold at any point in time, flow may proceed to 906, otherwise flow may proceed back to 802. For example, the demand monitor 110 may determine that the number of parallel locks on the data block 170 exceeds the threshold based on the number of pending database transactions that have requested a lock on the data block 170 and have not yet obtained a lock on the data block 170.

At 906, an indication of a high demand level may be generated for an item associated with an inventory count stored in the data block that has a number of parallel locks that exceed the threshold. For example, the demand monitor 110, after determining that the number of parallel locks on the block 170 exceeds the threshold for parallel locks, may generate an indication that the demand level for access to an item whose inventory count is stored in the data block 170 is high. The item may be, for example, the item whose inventory count was the target of the plurality of the database transactions that requested locks on the data block 170 resulting in the parallel locks on the data block 170 exceeding the threshold. For example, if the plurality of database transactions requesting locks on the data block 170 were generated to change the inventory count 171, the demand monitor 110 may generate an indication that the demand level for access to the item associated with the inventory count 171 is high. The indication may be, for example, an instruction or command that may indicate that the inventory count 171 should be isolated, and may be sent to the database manager 120.

Figure 10:
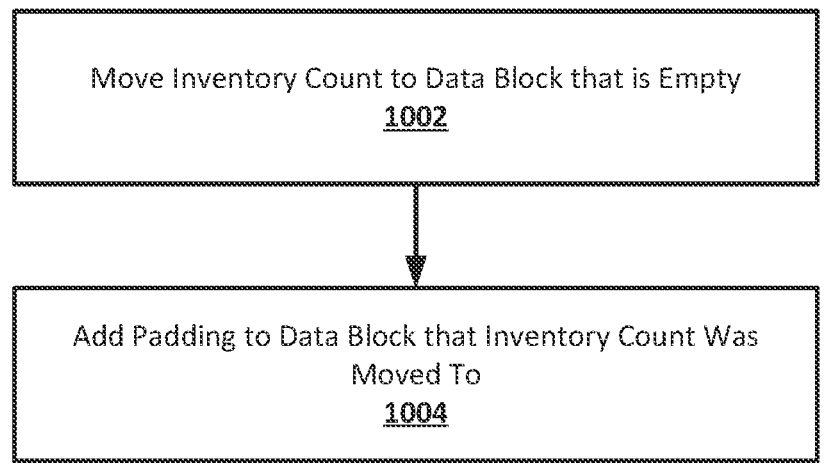
FIG. 10 shows an example procedure suitable for database inventory isolation according to an implementation of the disclosed subject matter.

FIG. 10 shows an example procedure suitable for database inventory isolation according to an implementation of the disclosed subject matter. At 1002, an inventory count may be moved to a data block that is empty. For example, the database manager 120 may have received an indication from the demand monitor 110 that the item associated with the inventory count 171 has a high demand level, and the inventory count 171 should be isolated. The inventory count 171 may be moved, for example, by the database manager 120, from the data block 170 to the data block 510, which may be empty. The data block 510 may already be allocated to the database 161 in the storage 150, or may be added to the data blocks allocated to the database 161 if the database 161 does not currently have any empty data blocks allocated to it. Moving the inventory count 171 may result in the inventory count 171 no longer being stored in the data block 170, instead being stored in the data block 510. While the inventory count 171 is being moved, database transactions generated to change the inventory count 171 may be paused, and may be modified or adjusted based on the moving of the inventory count 171 to the data block 510 so that when the database transactions are resumed, they target the correct the inventory count in the correct data block, At 1004, padding may be added to the data block that the inventory count was moved to. For example, after the inventory count 171 is moved to the data block 510, padding 511 may be added to the data block 510. The padding 511 may be, for example, junk data that fills the rest of the physical storage space available in the data block 510, or may otherwise be an indicator in the filesystem used by the storage 150 that the data block 510 is full and additional inventory counts should not be stored in the data block 510. The padding 511 may ensure that the inventory count 171 remains isolated in the data block 510 until such a time as the padding 511 is removed, allowing additional inventory counts to be stored in the data block 510. The padding 511 may be removed from the data block 510 after, for example, a specified time period has passed during which no database transactions accessed the data block 510 to change the inventory count 171. This may indicate that the item associated with the inventory count 171 no longer has a high demand level, and the inventory count 171 no longer needs to be isolated.

Figure 11:
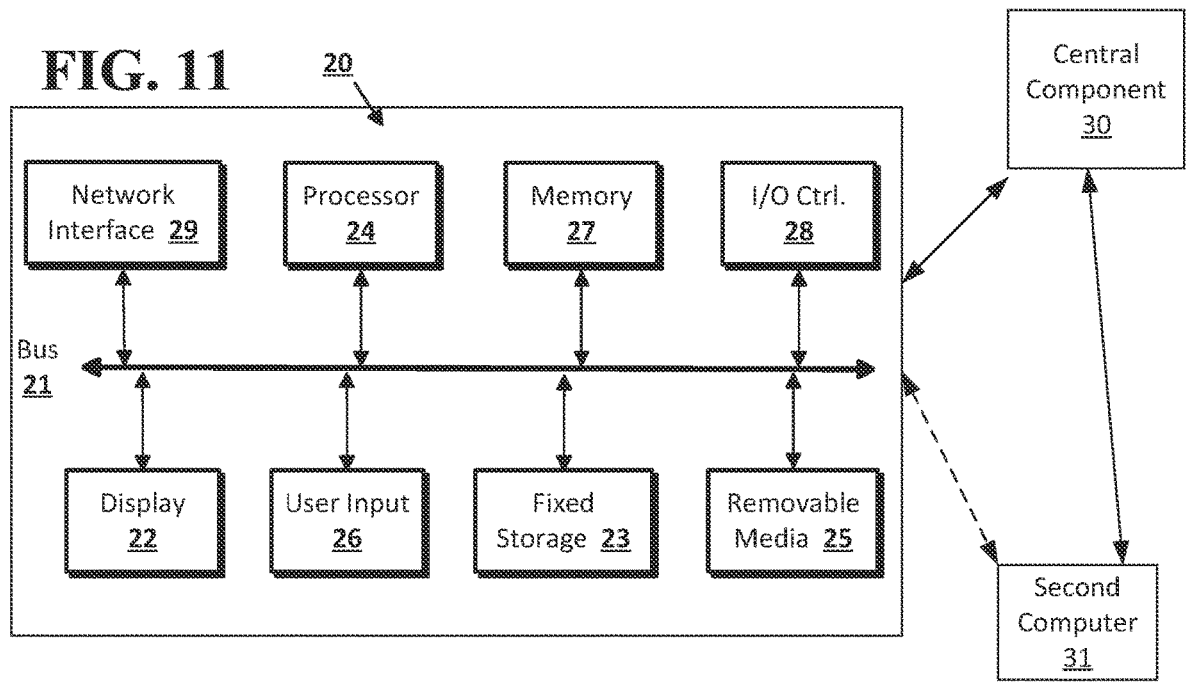
FIG. 11 shows a computer according to an implementation of the disclosed subject matter.

Implementations of the presently disclosed subject matter may be implemented in and used with a variety of component and network architectures. FIG. 11 is an example computer 20 suitable for implementing implementations of the presently disclosed subject matter. As discussed in further detail herein, the computer 20 may be a single computer in a network of multiple computers. As shown in FIG. 11, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 12.

Many other devices or components (not shown) may be connected in a similar manner (e.g., document scanners, digital cameras and so on). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, removable media 25, or on a remote storage location.

Figure 12:
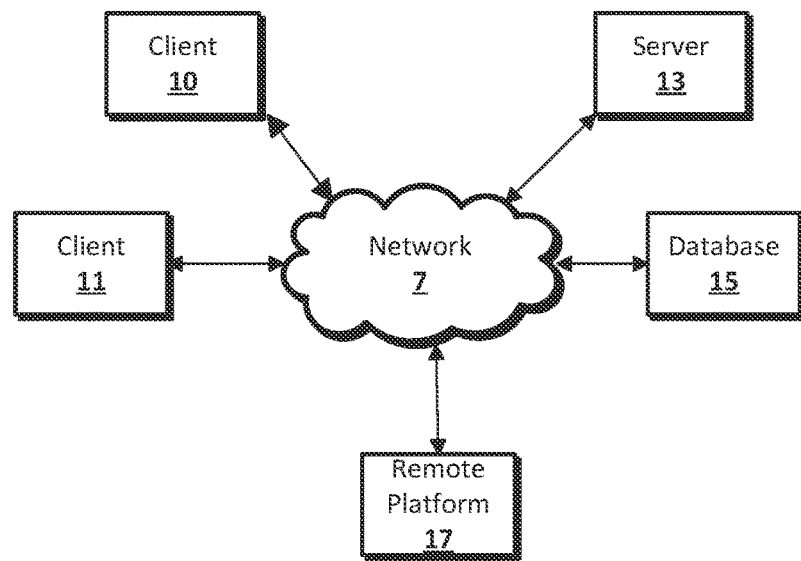
FIG. 12 shows a network configuration according to an implementation of the disclosed subject matter.

FIG. 12 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
    monitoring demand levels for access to items, wherein each of the items has an associated inventory count in a database stored in a physical storage of at least one computing device, the physical storage divided into data blocks that store the inventory counts, by monitoring lock events and unlock events for the data blocks which store the inventory counts;
    determining based on the demand levels an item of the items for which to isolate the inventory count associated with the determined item by determining, based on the lock events and unlock events, that the first block, which stores the inventory count associated with the determined item, is subject to a number of parallel locks greater than a threshold; and
    isolating the inventory count associated with the determined item by moving the inventory count associated with the determined item from a first data block, of the physical storage, that stores the inventory count associated with the determined item and inventory counts associated with others of the items to a second data block, of the physical storage, that does not store any other inventory counts.

2. The computer-implemented method of claim 1, wherein monitoring demand levels for access to items, wherein each of the items has an associated inventory count in a database, comprises monitoring the database for timeouts in accessing data blocks which store the inventory counts associated with the items,
    and wherein determining based on the demand levels an item for which to isolate the inventory count associated with the determined item comprises determining, based on the monitoring of the database for timeouts, that a timeout has occurred when accessing the first data block that stores the inventory count associated with determined item.

3. The computer-implemented method of claim 1, wherein monitoring demand levels for access to items, wherein each of the items has an associated inventory count in a database, comprises monitoring accesses to the inventory counts associated with the items;
    and wherein determining based on the demand levels an item for which to isolate the inventory count associated with the determined item comprises determining, based on the accesses to the inventory counts associated with the items, that the inventory count associated with the determined item has been accessed greater than a threshold number of times over a specified time period.

4. The computer-implemented method of claim 3, wherein the specified time period is based on a rolling window.

5. The computer-implemented method of claim 1, further comprising:
    determining that the inventory count associated with the determined item has not been accessed in the second data block for a specified period of time; and
    moving the inventory count associated with the determined item from the second data block to the first data block or second block to a third data block that stores inventory counts associated with others of the items, or moving inventory counts associated with one or more others of the items to the second data block.

6. The computer-implemented method of claim 1, further comprising adding padding to the second data block.

7. The computer-implemented method of claim 6, further comprising:
    determining that the inventory count associated with the determined item has not been accessed in the second data block for a specified period of time; and
    removing the padding from the second data block.

8. A computer-implemented system comprising:
    one or more storage devices; and
    a processor that monitors demand levels for access to items, wherein each of the items has an associated inventory count in a database stored in a physical storage of the one or more storage devices, the physical storage divided into data blocks that store the inventory counts, by monitoring lock events and unlock events for the data blocks which store the inventory counts, determines based on the demand levels an item of the items for which to isolate the inventory count associated with the determined item by determining, based on the lock events and unlock events, that the first block, which stores the inventory count associated with the determined item, is subject to a number of parallel locks greater than a threshold, and isolates the inventory count associated with the determined item by moving the inventory count associated with the determined item from a first data block, of the physical storage, that stores the inventory count associated with the determined item and inventory counts associated with others of the items to a second data block, of the physical storage, that does not store any other inventory counts.

9. The computer-implemented system of claim 8, wherein the processor monitors demand levels for access to items, wherein each of the items has an associated inventory count in a database, by monitoring the database for timeouts in accessing data blocks which store the inventory counts associated with the items, and wherein the processor determines based on the demand levels an item for which to isolate the inventory count associated with the determined item by determining, based on the monitoring of the database for timeouts, that a timeout has occurred when accessing the first data block that stores the inventory count associated with determined item.

10. The computer-implemented system of claim 8, wherein the processor monitors demand levels for access to items, wherein each of the items has an associated inventory count in a database, by monitoring accesses to the inventory counts associated with the items;

and wherein the processor determines based on the demand levels an item for which to isolate the inventory count associated with the determined item by determining, based on the accesses to the inventory counts associated with the items, that the inventory count associated with the determined item has been accessed greater than a threshold number of times over a specified time period.

11. The computer-implemented system of claim 10, wherein the specified time period is based on a rolling window.

12. The computer-implemented system of claim 8, wherein the processor further determines that the inventory count associated with the determined item has not been accessed in the second data block for a specified period of time, and moves the inventory count associated with the determined item from the second data block to the first data block or second block to a third data block that stores inventory counts associated with others of the items, or moving inventory counts associated with one or more others of the items to the second data block.

13. The computer-implemented system of claim 8, wherein the processor further adds padding to the second data block.

14. The computer-implemented system of claim 13, wherein the processor further determines that the inventory count associated with the determined item has not been accessed in the second data block for a specified period of time, and removes the padding from the second data block.

15. A system comprising: one or more computers and one or more non-transitory storage devices storing instructions which are operable, when executed by the one or more computers, to cause the one or more computers to perform operations comprising:

monitoring demand levels for access to items, wherein each of the items has an associated inventory count in a database stored in a physical storage of at least one computing device, the physical storage divided into data blocks that store the inventory counts, by monitoring lock events and unlock events for the data blocks which store the inventory counts;

determining based on the demand levels an item of the items for which to isolate the inventory count associated with the determined item by determining, based on the lock events and unlock events, that the first block, which stores the inventory count associated with the determined item, is subject to a number of parallel locks greater than a threshold; and isolating the inventory count associated with the determined item by moving the inventory count associated with the determined item from a first data block, of the physical storage, that stores the inventory count associated with the determined item and inventory counts associated with others of the items to a second data block, of the physical storage, that does not store any other inventory counts.

16. The system of claim 15, wherein the instructions that cause the one or more computers to perform operations comprising monitoring demand levels for access to items, wherein each of the items has an associated inventory count in a database, further comprise instructions that cause the one or more computer to perform operations comprising monitoring the database for timeouts in accessing data blocks which store the inventory counts associated with the items, and wherein the instructions that cause the one or more computers to perform operations comprising determining based on the demand levels an item for which to isolate the inventory count associated with the determined item further comprise instructions that cause the one or more computer to perform operations comprising determining, based on the monitoring of the database for timeouts, that a timeout has occurred when accessing the first data block that stores the inventory count associated with determined item.

17. The system of claim 15, wherein the instructions that cause the one or more computers to perform operations comprising monitoring demand levels for access to items, wherein each of the items has an associated inventory count in a database, further comprise instructions that cause the one or more computer to perform operations comprising monitoring accesses to the inventory counts associated with the items;

and wherein the instructions that cause the one or more computers to perform operations comprising determining based on the demand levels an item for which to isolate the inventory count associated with the determined item further comprise instructions that cause the one or more computer to perform operations comprising determining, based on the accesses to the inventory counts associated with the items, that the inventory count associated with the determined item has been accessed greater than a threshold number of times over a specified time period.

* * * * *